United States Patent [19]
Moriyama et al.

[11] 3,906,165
[45] Sept. 16, 1975

[54] LINE CIRCUIT IN AUTOMATIC SWITCHING SYSTEM

[75] Inventors: Hiromi Moriyama, Fujisawa; Motosuke Kuwabara, Yokohama; Katsuyuki Jin, Kawasaki, all of Japan

[73] Assignee: Hitachi, Ltd., Japan

[22] Filed: July 25, 1974

[21] Appl. No.: 491,633

[30] Foreign Application Priority Data

July 30, 1973 Japan ............................... 48-84878

[52] U.S. Cl. ............................................... 179/18 F
[51] Int. Cl.[2] ........................................... H04Q 3/18
[58] Field of Search ............ 179/18 H, 18 F, 18 FA, 179/18 G, 19, 30, 17 R, 17 B

[56] References Cited

UNITED STATES PATENTS

| | | | |
|---|---|---|---|
| 2,199,534 | 5/1940 | Bakker | 179/18 F |
| 3,156,777 | 11/1964 | Horwitz et al. | 179/18 F |
| 3,488,441 | 1/1970 | Peitz | 179/18 F X |
| 3,770,896 | 11/1973 | Altenburger | 179/18 F |

*Primary Examiner*—Thomas A. Robinson
*Attorney, Agent, or Firm*—Craig & Antonelli

[57] ABSTRACT

A line circuit provided between subscriber lines and a switching network and having a line relay and a cut-off relay therein, in which the subscriber lines are connected to the switching network through the make contacts of transfer contacts of the cut-off relay and through the make contacts of transfer contacts of the line relay.

5 Claims, 2 Drawing Figures

LINE CIRCUIT IN AUTOMATIC SWITCHING SYSTEM

This invention relates to a line circuit in an automatic switching system.

A line circuit is disposed between subscriber lines and a switching network and functions in such a manner that it operates in response to the operation of a subscriber terminal equipment or of the switching network to establish a circuit state corresponding to the operating state of the terminal equipment and switching network and to indicate such circuit state to a control unit.

A variety of line circuits attaining the function described above are commonly known. A known line circuit comprises two relays, that is, a line relay which is normally connected to subscriber lines terminating in a subscriber terminal equipment and a so-called cut-off relay which cuts off the line relay from connection with the subscriber lines during talking. This known line circuit can take one of four circuit states, that is, an "idle" (normal) state, a "origination requesting" state, a "busy" state and a "lockout" state.

However, due to the fact that this known line circuit is arranged to directly connect the subscriber lines to the switching network at all times, the following defect has been given rise to: Once the subscriber terminal equipment is connected to a register or a trunk through the switching network, the subscriber terminal equipment remains connected to the register or trunk even when the line circuit is placed in the "lockout" state unless the switching network is released, and the register or trunk is uselessly held when the subscriber terminal equipment is in the originating or "busy" state. When the switch is of the current holding type, the above defect is not so appreciable since the switching network can be easily released at the same time as when the line circuit is placed in the "lockout" state. However, in the case in which the switching network is of the non-current holding type such as the mechanical holding type or magnetic holding type, release control for the switching network is required and the load of the control unit is increased.

In the known line circuit, the line relay is normally connected to the subscriber lines in an unbalanced relationship, and an induced noise tends to occur in the subscriber lines. Thus, there has been the tendency of mal-starting due to the induced noise especially when the subscriber terminal equipment is a terminal installation for data transmission.

Further, many contacts or at least five contacts have been required in each of the line relay and cut-off relay in the known line circuit so as to successfully attain alteration of the circuit state and indication of the altered circuit state.

It is therefore an object of the present invention to provide a novel and improved line circuit having a line relay and a cut-off relay which can be incorporated even in a switching system employing a switching network of the non-current holding type so as to eliminate substantially the necessity for release control for the switching network. To attain this object, the line circuit according to the present invention is arranged so that subscriber lines can be connected to the switching network through the make contacts of transfer contacts of the cut-off relay and through the make contacts of transfer contacts of the line relay in the "busy" state only.

Another object of the present invention is to prevent the subscriber lines connected to the line circuit from being affected by an induced noise in the "idle" state of the line circuit. To this end, a relay provided with a pair of windings having substantially the same electrical property is used as the line relay in the line circuit of the present invention, and these two windings are normally connected to the corresponding subscriber lines respectively.

Still another object of the present invention is to provide a compact line circuit in which both the line relay and the cut-off relay are small in size and have a small number of transfer contacts. To this end, both the line relay and the cut-off relay in the line circuit of the present invention have four transfer contacts which constitute the circuit together with a plurality of diodes. (One of the transfer contacts of the cut-off relay may be replaced by a simple make contact or a diode.)

In accordance with the present invention, there is provided a line circuit connected between a pair of subscriber lines and a switching network, comprising a pair of talking lines, a control line, a line relay having a plurality of windings and a plurality of transfer contacts, and a cut-off relay having a winding and a plurality of transfer contacts, wherein said subscriber lines are connected to said switching network through the make contacts of a first and a second transfer contact of said cut-off relay and through the make contacts of a first and a second transfer contact of said line relay, and the windings of said line relay and the winding of said cut-off relay are respectively connected to the break contacts of the first and second transfer contacts of said cut-off relay and to the break contact of the first transfer contact of said line relay, one of said windings of said line relay and said winding of said cut-off relay being further connected to said control line through the make contact of a third transfer contact of said cut-off relay and through a diode respectively.

The above and other objects, features and advantages of the present invention will become apparent from the following detailed description taken in conjunction with the accompanying drawing, in which.

Figure 1:
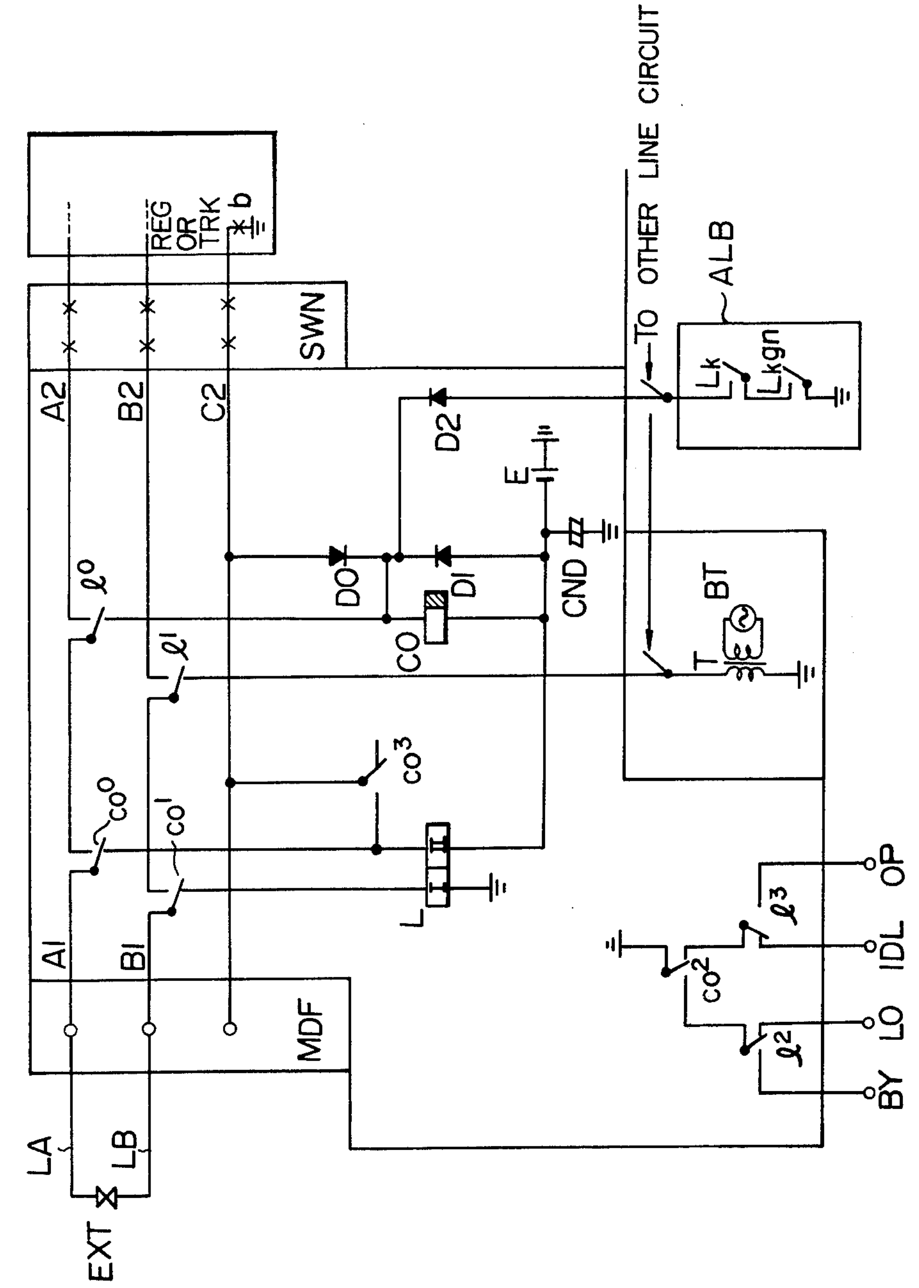
FIG. 1 is a circuit diagram of an embodiment of the present invention.

Referring now to FIG. 1, a line circuit according to the present invention comprises a line relay L provided with a pair of windings I and II having substantially the same electrical property, a cut-off relay CO having a slow releasing property, a plurality of transfer contacts $l^0$ to $l^3$ of the line relay L, a plurality of transfer contacts $co^0$ to $co^3$ of the cut-off relay CO, and a plurality of diodes D0 to D2.

Talking lines A1 and B1 on the subscriber terminal side of the line circuit extend to a subscriber terminal equipment EXT through a distribution frame MDF and respective subscriber lines LA and LB. Talking lines A2 and B2 on the switch side of the line circuit are connected to a switching network SWN which may be composed of crossbar switches. A series circuit of the make contacts of the transfer contacts $co^0$ and $l^0$ of the respective relays CO and L is connected between the talking lines A1 and A2, and another series circuit of the make contacts of the transfer contacts $co^1$ and $l^1$ of the respective relays CO and L is connected between the talking lines B1 and B2.

The windings I and II of the two-winding line relay L are connected at one end thereof to the break contacts of the respective transfer contacts $co^1$ and $co^0$ of the cut-off relay CO, and at the other end thereof to ground and to a battery E respectively.

The break contact of the transfer contact $l^0$ of the line relay L is connected to the battery E through the winding of the cut-off relay CO, and the break contact of the transfer contact $l^1$ of the line relay L is grounded through a secondary winding of a transformer T which is provided for sending out a busy tone BT. The subscriber circuit includes another line or control line C2 connected to the switching network SWN. This control line C2 is connected through the make contact of the transfer contact $co^3$ of the cut-off relay CO to the connection point between the winding II of the line relay L and the transfer contact $co^0$ of the cut-off relay CO and through the diode DO to the connection point between the winding of the cut-off relay CO and the transfer contact $l^0$ of the line relay L.

The diodes D1 and D2 are connected at one terminal thereof to the connection point between the winding of the cut-off relay CO and the transfer contact $l^0$ of the line relay L. These diodes D1 and D2 are respectively connected at the other terminal thereof to the battery E and to an all-link-busy circuit ALB in a control unit.

The remaining two transfer contacts $l^2$ and $l^3$ of the line relay L and the remaining one transfer contact $co^2$ of the cut-off relay CO constitute a tree circuit which indicates four states of the line circuit to the control unit. More precisely, the following four states are distinguished by the combination of the transfer contacts $l^2$, $l^3$ and $co^2$:

| | Contacts $l^2$, $l^3$ (relay L) | Contact $co^2$ (relay CO) | State |
|---|---|---|---|
| 1 | Deenergized | Deenergized | Idle (normal) |
| 2 | Energized | Deenergized | Origination requesting |
| 3 | Energized | Energized | Busy |
| 4 | Deenergized | Energized | Lockout |

The operation of the line circuit shown in FIG. 1 will now be described.

In the "idle" state in which no request for origination is made from the subscriber terminal equipment EXT, both the line relay L and the cut-off relay CO are in the deenergized state, and the windings I and II of the line relay L are connected to the subscriber lines LA and LB respectively.

When the subscriber requesting origination manipulates the subscriber terminal equipment EXT (or when the subscriber takes off the handset in the case of a telephone), a closed d.c. circuit including the subscriber lines LA and LB is established in the subscriber terminal equipment EXT, and the line relay L is energized by the route which is traced from ground-winding I of line relay L — break contact of transfer contact $co^1$ — line B1 — line LB — subscriber terminal equipment EXT — line LA — line A1 — break contact of transfer contact $co^0$ — winding II of line relay L to the battery E. In response to the energization of the line relay L, current flows through the route which is traced from ground — break contact of transfer contact $co^2$ — make contact of transfer contact $l^3$ to a terminal OP to indicate to the control unit the fact that origination is requested.

The control unit identifies the position of the origination requesting subscriber terminal equipment EXT on the switching network SWN by a circuit (not shown) and connects this specific subscriber terminal equipment EXT to a register REG through the switching network SWN. Upon completion of this connection, a contact *b* in the register REG is closed to connect the control line C2 in the line circuit to ground. As a result, the cut-off relay CO is energized via the diode DO, and the line relay L is held in the energized position via the contact $co^3$. The subscriber terminal equipment EXT is connected to the switching network SWN through the make contacts of the transfer contacts $co^0$, $co^1$, $l^0$ and $l^1$ as soon as the cut-off relay CO is energized. When subsequently the calling subscriber dials the telephone number of the called subscriber, the subscriber terminal equipment EXT is connected to a required trunk TRK and he can talk with the called subscriber. During this talking period of time, both the line relay L and the cut-off relay CO are continuously held in the energized state due to the fact the control line C2 is grounded via the register REG or trunk TRK, and the "busy" state is indicated to the control unit by the route which is traced from ground — make contact of transfer contact $co^2$ — make contact of transfer contact $l^2$ to a terminal BY.

When the subscriber terminal equipment EXT is released after the talking, the register REG or trunk TRK is released and the contact *b* is opened, with the result that both the line relay L and the cut-off relay CO are deenergized to restore the line circuit to the original "idle" (or normal) state.

The line circuit operates in the manner above described when the subscriber requesting transmission manipulates the subscriber terminal equipment EXT. In the case of reception, the line circuit is connected to a suitable trunk TRK and the cut-off relay CO is energized via a contact *b* of the trunk TRK. Then, the line relay L is energized via the transfer contact $co^3$ of the cut-off relay CO. Thus, the line circuit is placed in the "busy" state and the talking lines A2 and B2 are connected directly to the talking lines A1 and B1.

The operation of the line circuit in the "lockout" state will next be described. Transition to the "lockout" state occurs from the "busy" or "origination requesting" state. At first, transition to the "lockout" state from the "busy" state will be described.

In the "busy" state, both the line relay L and the cut-off relay Co are in the energized state and the line circuit is connected to a register REG or trunk TRK. A contact *b* in the register REG or trunk TRK is opened relay the register REG or trunk TRK is required to release itself due to time-out or for any other reasons. In response to the opening of the contact *b* in the register REG or trunk TRK, the line relay L and cut-off relay CO start to release themselves. Due to the fact that the cut-off relay CO is of the slow releasing type and the diode D1 is connected in parallel therewith, the line relay L releases itself prior to release of the cut-off relay Co and a holding circuit for the cut-off relay CO is established which is traced from ground — secondary winding of transformer T — break contact of transfer contact $l^1$ — make contact of transfer contact $co^1$ — line B1 — line LB — subscriber terminal equipment EXT — line LA — line A1 — make contact of transfer contact $co^0$ — break contact of transfer contact $l^0$ 413 winding of cut-off contact $co^{CO\ to\ the\ battery\ E.}$ The cut-off relay CO is continuously energized by the holding circuit above described during the period of time in which the subscriber using the subscriber terminal equipment EXT is requesting origination or talking, and the "lockout" state is indicated by the route which is traced from ground — make contact of transfer contact $co^2$ — break contact of transfer contact $l^2$ to a terminal LO. THe busy tone BT is delivered through the transformer T to the holding circuit for the cut-off relay CO. A capacitor CND is connected to the battery E to provide a return path for the busy tone current.

Transition from the "origination requesting" state to the "lockout" state will next be described. In the "origination requesting" state in which the line relay L is energized, the control unit selects a register REG and tests for and seizes an "idle" link in the switching network SWN so as to connect the line circuit to the register. When no "idle" link connectable to this line circuit is found in the switching network SWN, contacts *lk*gn and *lk* in the all-link-busy circuit ALB are closed by the control unit. As a result, the cut-off relay CO is energized by the route which is traced from groundcontact *lk*gn contact *lk*-diode D2-winding of cut-off relay CO to the battery E, and the line relay L is cut-off from connection with the subscriber terminal equipment EXT by the transfer contacts $co^0$ and $co^1$ of the cut-off relay CO. The line relay L is released to establish a holding circuit including the subscriber terminal equipment EXT for holding the cut-off relay CO in the "lockout" state. Subsequent operation is the same as that described with reference to the transition from the "busy" state to the "lockout" state.

In the embodiment shown in FIG. 1, both the line relay L and the cut-off relay CO have four transfer contacts. However, the transfer contact $co^3$ of the cut-off relay CO may of course be a simple make contact, or it may be replaced by a diode D3 as shown in FIG. 2.

Figure 2:
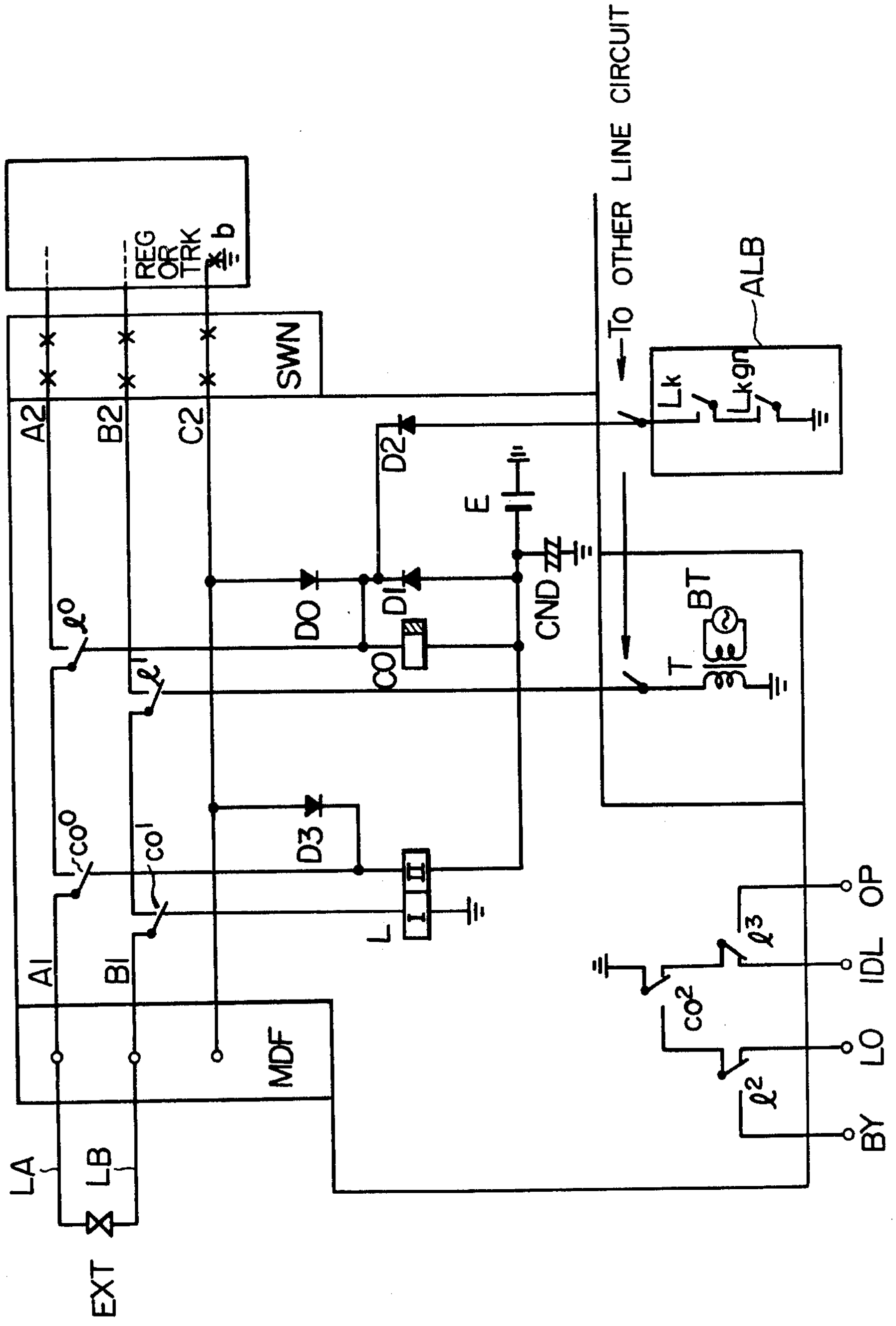
FIG. 2 is a circuit diagram of another embodiment of the present invention.

Another embodiment of the present invention shown in FIG. 2 is a modification of the embodiment shown in FIG. 1. Therefore, this embodiment operates in entirely the same manner as that of the embodiment shown in FIG. 1 except that the line relay L and the cut-off relay CO are simultaneously placed in operation in response to grounding of the control line C2. The embodiment shown in FIG. 2 is advantageous in that one of the four transfer contacts of the cut-off relay CO can be utilized for other service since three of these four transfer contacts participate in the required operation. Further, in the second embodiment, both the line relay L and the cut-off relay Co are simultaneously energized during tran sition of the circuit state to the "busy" state. This is advantageous for reducing the holding time of the control unit when the control unit in the switching system is adapted to test for continuity of the lines extending to the subscriber terminal equipment EXT.

It will be understood from the foregoing description that the line circuit according to the present invention is arranged to connect the subscriber lines to the switching network in the "busy" state only. Thus, release control for the switching network is not especially necessary even in the "lockout" state. Further, due to the fact that the line relay used in the line circuit is provided with a pair of windings having substantially the same electrical property and these two windings are respectively connected to the corresponding subscriber lines, the subscriber lines can be electrically balanced with each other in the normal state of the line circuit and undesirable appearance of induced noise can be substantially eliminated. Furthermore, the instrumentation efficiency of the line circuit according to the present invention is high due to the fact that the line relay and cut-off relay both of which have only four transfer contacts and are small in size are used to constitute the circuit by the combination of these transfer contacts and diodes.

What is claimed is:

1. A line circuit connected between a pair of subscriber lines and a switching network, comprising a pair of talking lines, a control line, a line relay having a plurality of windings and plurality of transfer contacts, and a cut-off relay having a winding and a plurality of transfer contacts, wherein said subscriber lines are connected to said switching network through the make contacts of a first and a second transfer contact of said cut-off relay and through the make contacts of a first and a second transfer contact of said line relay, and the windings of said line relay and the winding of said cut-off relay are respectively connected to the break contacts of the first and second transfer contacts of said cut-off relay and to the break contact of the first transfer contact of said line relay, one of said windings of said line relay and said winding of said cut-off relay being further connected to said control line through the make contact of a third transfer contact of said cut-off relay and through a diode respectively.

2. A line circuit as claimed in claim 1, wherein a fourth transfer contact of said cut-off relay and a third and a fourth transfer contact of said line relay constitute a circuit which indicates the state of the line circuit.

3. A line circuit as claimed in claim 1, wherein said one winding of said line relay is connected to said control line through a diode.

4. A line circuit as claimed in claim 1, wherein said line relay is provided with a pair of windings having substantially the same electrical property, and these two windings are connected respectively to the corresponding talking lines.

5. A line circuit as claimed in claim 1, wherein said cut-off relay is of the slow releasing type.

* * * * *